Dec. 15, 1964  G. R. ASCHAUER  3,161,270
FRICTIONAL AND POSITIVE PROGRESSIVE ENGAGEMENT CLUTCH
Filed Feb. 27, 1963  2 Sheets-Sheet 1
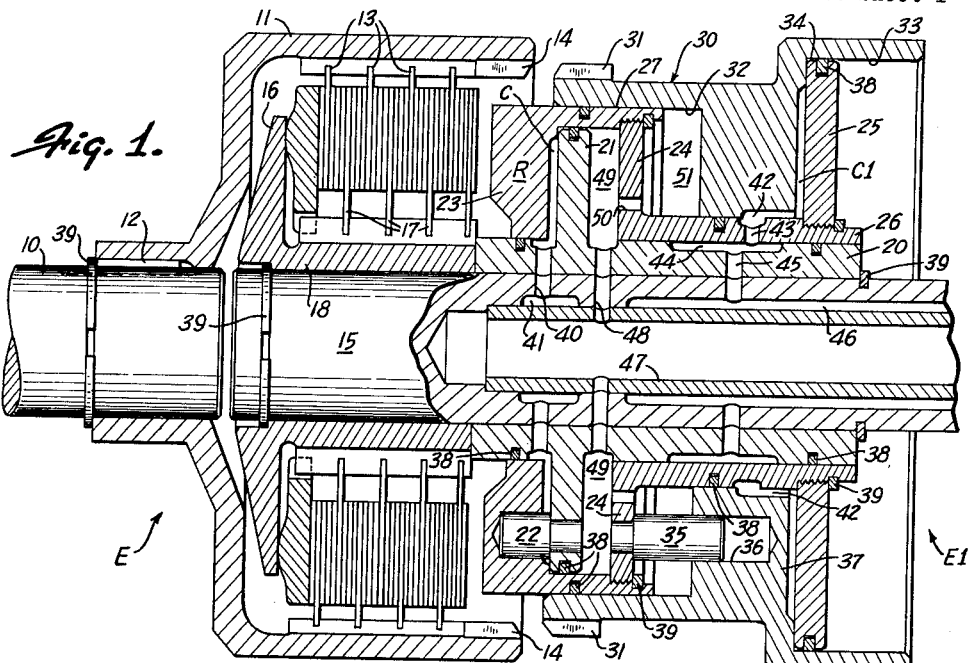
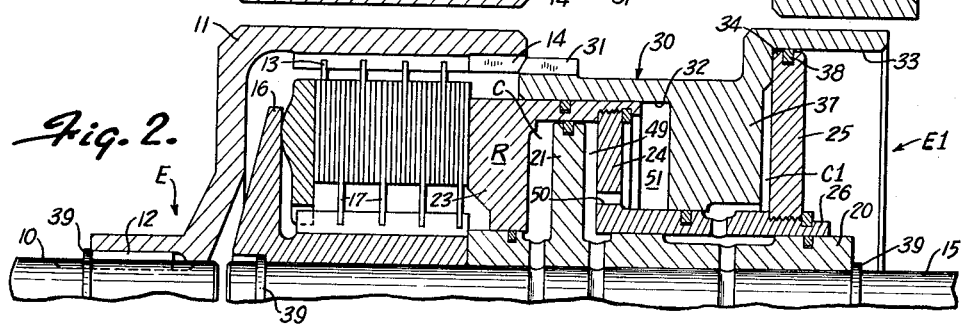
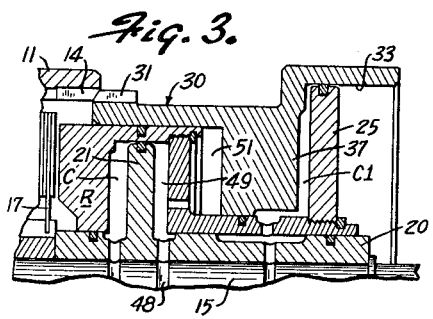
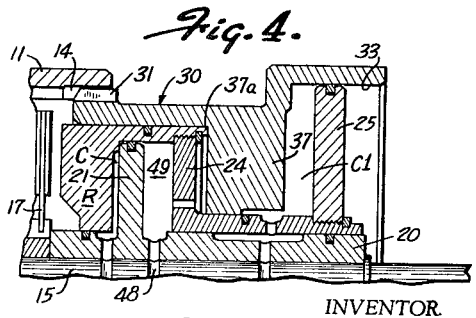
INVENTOR.
GEORGE R. ASCHAUER
BY
Lieber & Nilles
ATTORNEYS

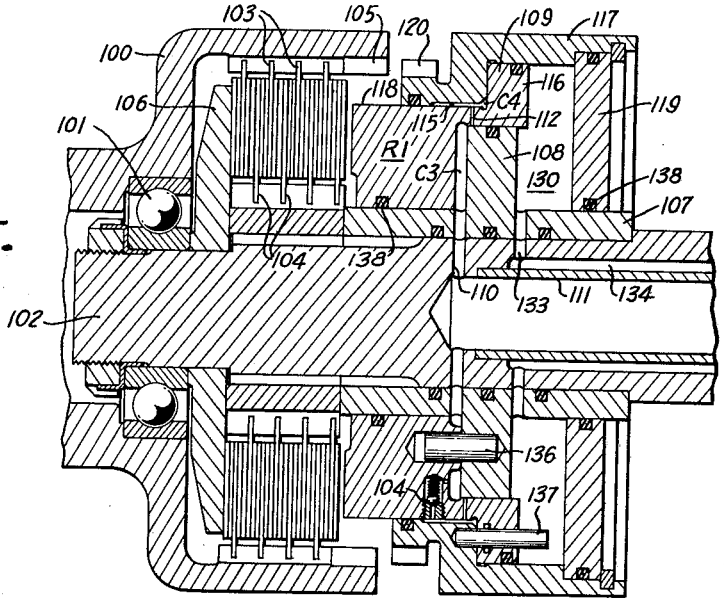
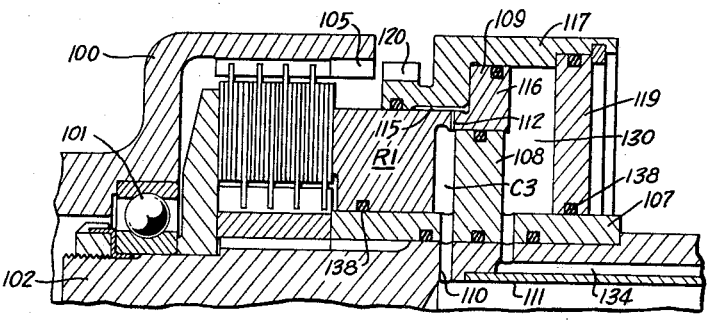
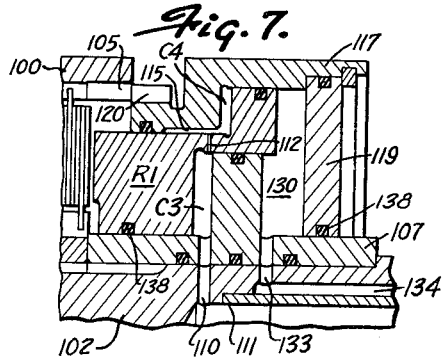
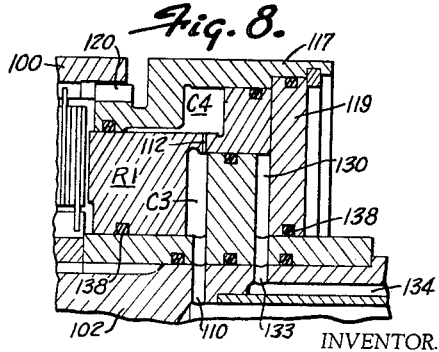

United States Patent Office
3,161,270
Patented Dec. 15, 1964

3,161,270
FRICTIONAL AND POSITIVE PROGRESSIVE ENGAGEMENT CLUTCH
George R. Aschauer, Racine, Wis., assignor to Twin Disc Clutch Company, Racine, Wis., a corporation of Wisconsin
Filed Feb. 27, 1963, Ser. No. 261,284
9 Claims. (Cl. 192—53)

This invention relates to synchronizing clutch mechanisms of the type having a pressure fluid actuated friction clutch for synchronizing the speed of the elements which are to be clutched together, and after the elements are rotating at a synchronized speed, cluch means on the elements are interengaged to provide a positive drive between the elements.

With this type of clutch mechanism, two rotatable elements are brought into synchronization by the friction clutch, which permits slipping between the clutch faces at the start of clutch engagement, but subsequently brings the elements to the same speed. Positive lock-up between the elements is then made by the clutch means, which permits the transmission of large torques with little space or weight requirements.

This type of clutch is commonly referred to as a "fail-safe" clutch and can efficiently transmit both the accelerating torques and the greater working torques. These high energy clutches must be light in weight and compact in design for many uses, such as for example, in aircraft, marine vessels and gas turbines where they find particular utility.

In this type of clutch, after the rotative speeds of the elements have been synchronized, it is often difficult to cause the clutch teeth to become engaged because the elements stop at random locations relative to one another, and the teeth on one may not be alined with those of the other element. This problem is discussed but not solved in the U.S. Patent Number 3,063,529, issued Nov. 13, 1962 to C. A. Cook and entitled, "Locking Clutch" (see column 6, lines 47 to 57), and there excessive torque is relied on to slip the engaged discs.

Certain prior art devices have been proposed for overcoming this difficulty and have been used with a certain amount of success. An example of one type of such prior art is shown in U.S. Patent Number 3,071,224 issued on January 1, 1963, which utilizes a "blocker system" including balking pins and associated cam surfaces on a pressure ring to cause slipping of the friction clutch and simultaneous engagement of the clutch connection. This type of prior art device has certain shortcomings in that many parts are required which are expensive to manufacture, assemble, service and adjust; furthermore, these parts require very accurate machining to produce a uniform division of the load among the parts, such as the balking pins.

Other prior art devices of this general character are not entirely dependable because they sometimes fail to engage or "kick back" out of engagement after the friction clutch begins to slip, which results in the clutch "driving away."

Accordingly, the present invention provides a clutch mechanism having a synchronizing friction clutch and a subsequently actuated clutch coupling, and a pair of expansible pressure fluid chambers which are pressurized in timed relationship with one another whereby one chamber first causes engagement of the friction clutch, and the other chamber then causes slipping of the clutch and immediate lock-up of the clutch coupling.

More specifically, the present invention provides a clutch mechanism having a synchronizing friction clutch and subsequently engaged clutch means, wherein an expansible fluid chamber is provided between a friction clutch actuating pressure ring and the clutch means; as a result, pressurization of this chamber causes (1) the pressure on the friction clutch to be relieved and slipping then occurs, and (2) the clutch means are immediately urged into engagement. Stated otherwise, equal and opposite pressure forces are utilized to detract from the frictional holding ability of the friction clutch and simultaneously force the clutch means toward its engaged position. In the present arrangement, there is an instantaneous recognition of a pressure reduction and consequent slippage of the clutch, and an immediate engagement of the clutch means, to thereby provide positive control and smooth operation of the complete clutching function.

A more limited aspect of the present invention is to provide a mechanism of the above type in which pressure fluid enters one expansible chamber and causes the friction clutch to be engaged thereby synchronizing the rotatable elements, and also the clutch means of the elements are simultaneously brought closer together toward the engaged position. The timing and relative movement of the parts then permits this same pressure fluid to act in the other expansible chamber which is located between the friction clutch actuating ring and the clutch means. The arrangement makes it necessary to have only a single actuating control which causes commencement of the synchronization of the elements, and after a predetermined time delay, then results in momentary and slight slipping between the elements and immediate and positive lock up thereof.

A general object of the present invention is to provide a clutch mechanism having a synchronizing friction clutch and a subsequently connected mechanical drive between the rotatable elements, without the necessity of employing balking pins or other blocker system type devices.

These and other objects and advantages of the present invention will appear hereinafter as this disclosure progresses, reference being had to the accompanying drawings, in which:

FIGURE 1 is a longitudinal sectional view through a clutch mechanism made in accordance with the present invention, and showing the mechanism in the disengaged position;

FIGURE 2 is a fragmentary view of certain parts of the FIGURE 1 mechanism but showing only the friction clutch engaged;

FIGURE 3 is a view similar to FIGURE 2 but showing the position of the parts when the second chamber is pressurized and the pressure on the clutch discs is relieved and the gear teeth are still not alined;

FIGURE 4 is a view similar to FIGURE 3 but showing a subsequent relative position of the parts when the clutch means have been axially aligned and are in positive driving engagement;

FIGURE 5 is a longitudinal sectional view through another clutch made in accordance with the present invention, this clutch being a modification from the FIGURE 1 clutch and of the "over and under" design type;

FIGURE 6 is a fragmentary showing of the FIGURE 5 device but when the friction clutch only is engaged;

FIGURE 7 is a view similar to FIGURE 6 but showing that pressure fluid has entered the second expandable chamber and the clutch teeth on the elements are in contact but have not been aligned, and the pressure on the friction clutch discs has just been relieved; and FIGURE 8 is a view similar to FIGURE 7 but showing the mechanism in mechanical driving position.

Referring in greater detail to the FIGURE 1 mechanism, a drive element E takes the form of a drive shaft 10 which is connected to a source of power (not shown)

and has a friction clutch drum 11 fixed thereto by a key 12. The drum has friction discs 13 secured on the inner side in the conventional manner for rotation with the drum.

The free end of the drum 11 has gear means formed thereon in the form of clutch teeth 14 that extend circumferentially around the inner surface of the drum.

A driven element E1 includes a coaxially aligned shaft 15 having a disc back up member 16 axially fixed thereto. Friction discs 17 are fixed on the long hub 18 of member 16 for rotation with the shaft 15 and member 16 as a unit.

The discs are axially compressible together against the back up member 16 to form a frictional driving connection between the rotatable elements. In high speed clutches of this type, these plates must be cooled and for this purpose may be of the type as shown and described in my U.S. Patent Number 3,063,531, issued on November 13, 1962, but further reference to the construction of these plates and their cooling is deemed neither necessary nor desirable for purposes of the present invention.

The driven element E1 also includes a fluid passage sleeve 20 which is fixed to the shaft 15 and may be considered an integral part thereof. This sleeve has a radially extending, annular flange 21 which together with an axially slidable pressure ring R forms an expansible chamber C. Relative rotation between the ring R and flange 21 is prevented by conventional pins 22 (only one shown) which are fixed in the flange and over which the ring slides.

The ring R includes a disc compressing portion 23, an intermediate and transversely extending wall 24, and a rear, transverse wall 25. The portion 23 and another hub portion 26 of the ring are sealingly and slidably mounted on the sleeve 20. The ring also has a smoothly finished external cylindrical surface 27.

The driven element E1 further includes a clutch member 30 which is hydraulically actuated so as to be axially reciprocal to the left (as viewed in FIGURE 1) towards an engaged position, or to the right to a clutch release position, as will appear. Clutch member 30 has external clutch teeth 31 at one end which are engageable with the teeth 14 of the drive element to form a positive mechanical drive between the drive and driven elements.

The internal, cylindrical surface 32 of member 30 forms a slidable sealing fit with the external surface 27 of the ring R. A diametrically larger internal surface 33 at the other end of the clutch member forms a slidably sealing fit with the periphery 34 of wall 25 of the ring R. An expansible fluid pressure chamber C1 is thus formed between the ring and the clutch member. It will be noted that chamber C1 has a larger pressure effective, cross sectional area than does chamber C.

Relative rotation between the ring and member 30 is prevented by pins 35 which are fixed to wall 24 and are slidable in apertures 36 in the transverse wall 37 of member 30.

Other conventional devices than pins 22 and 35 may be employed for preventing relative rotation between the various component parts of the driven member. Suitable fluid relief passages (not shown) are used to relieve any fluid pressure build up that may occur due to fluid seepage, as for example, into the bottom of apertures 36, to thereby insure rapid and properly timed movement of the various parts.

A sliding seal is provided between the sliding members by conventional sealing rings 38. Conventional snap rings 39 are also used to prevent axial displacement wherever desired.

Pressure fluid, such as oil or air, is introduced into chamber C via port 40 and the annular passage 41, and is supplied from a suitable source (not shown) of pressure fluid by opening a control valve (not shown) of any conventional type, either manually operated or in response to other components in the system with which the present clutch is used.

Chamber C1 is pressurized with fluid via axial passage 46, port 45, wide annular groove 44, port 43 in the ring, and then through the groove 42. The pressure source (not shown) may be the same as that for chamber C, and a suitable second control (not shown) is used for admitting fluid into chamber C1 at the proper time in and for the proper duration of the clutch operating cycle.

*Operation of FIGURE 1 Mechanism*

The friction clutch and mechanical clutch connection are progressively actuated as follows. Fluid pressure is admitted into chamber C which causes the pressure ring to shift into disc compressing position, thus establishing a frictional drive between the rotatable elements and bringing them up to synchronized speed. Accelerating torque is present during this time and the friction clutch inherently permits an amount of slipping, particularly at the beginning of the clutching operation. The axial movement of the pressure ring to the left has also brought the clutch member 30 into proximity with the clutch teeth 14 on the drum and contact between teeth 14 and 31 may actually occur at this time as shown in FIGURE 2. When the speed of the elements has been synchronized, the elements have stopped relative to one another at any random rotative position relative to one another, and their teeth may not be in the necessary axial alignment to permit the necessary tooth engagement.

Pressure fluid is then admitted, either manually or because of some signal of another part of the system, into chamber C1. It will be recalled that chamber C1 has a greater pressure area than does chamber C, and therefore a common pressure source may be utilized. The effect of introducing fluid into chamber C1 is to expand it, causing the ends of the ring teeth 31 to bear firmly against the ends of misaligned teeth 14. As a result, at that time the pressure ring R is caused to move to the right (FIG. 3), that is, away from the discs, thereby relieving the pressure on the discs and permitting the friction clutch to slip. This slippage causes teeth 14 to move slightly ahead of teeth 31 in the direction of clutch rotation, causing axial alignment of the teeth. The clutch member 30 is then immediately free to be driven fully to the left (FIGURE 4) until the wall 37 abuts against the shoulder 37a of the ring, and teeth 31 then mesh in full engagement with teeth 14.

If the elements had stopped originally with their teeth in axial alignment, which may happen occasionally, then when pressure was admitted to chamber C1, the clutch member would simply move without hesitation into gear engagement.

To release the clutch and effect its complete disengagement, chambers C and C1 are opened to exhaust, and fluid is admitted via axial passage 47, port 48, and into release chamber 49, which begins to move the pressure ring R to the right. At the same time this same fluid passes through port 50 and enters another release chamber 51 to cause retraction (to the right in FIGURE 1) of the clutch member relative to the ring member.

The above mechanism utilizes a pair of sequentially pressurized expansible chambers which are in axial alignment. This design results in an elongated but radially compact clutch.

The above design also utilizes a two-control system with a time delay in between.

*FIGURE 5 Mechanism*

The clutch now to be described is shown in FIGURE 5 and has its two expansible chambers arranged in radially stacked or "over and under" relationship. In addition, a single control is used and the second chamber is automatically pressurized as a result of movement of the pressure ring during its speed synchronizing function.

In FIGURE 5, the drive element is comprised of a drum 100 which is piloted on the anti-friction bearing assembly 101 mounted on the shaft 102 of the driven element. The drive element also includes discs 103 which interleave with discs 104 of the driven element. Clutch teeth means 105 are formed on the end of drum 100. The discs are compressed by the axially shiftable pressure ring R1 against the back up plate 106 fixed with shaft 102.

A sleeve 107 is rigidly fixed on shaft 102 and has an annular flange 108 extending outwardly therefrom.

The ring R1 forms a sliding seal fit with and on sleeve 107 and has an axial flange portion 109 that forms a sliding seal fit with the periphery of flange 108.

Ring R1 forms an expansible chamber C3 with the flange 108. Fluid pressure is introduced into this chamber via port 110 and axial bore 111 in the shaft 102.

Another port 112 is formed in ring R1 and is blocked when the clutch is in the disengaged position as shown in FIGURE 5. When the ring moves to the left, a predetermined distance, that is towards the friction clutch engaged position, the port 112 is uncovered and the same fluid pressure is permitted to enter a chamber C4 via the axial passage 115.

The second expansible chamber C5 is formed between an annular flange 116 of the ring and a clutch member 117, member 117 forming a sliding seal fit with flange 116 and the periphery of portion 118 of the ring. The clutch member also includes a rear wall 119 which forms a sliding seal fit with sleeve 107.

Clutch teeth 120 are formed on the end of the clutch member which are engageable with the teeth 105 of the drum 100.

An expansible clutch release chamber 130 is formed by and between the clutch member 117, the outer flange portion 116 of the ring, and flange 108 of the sleeve. Fluid is admitted to this chamber 130 via port 133 and passage 134, to thereby cause retraction (to the right) of the clutch member and consequent retraction of the pressure ring.

Pins 136 and 137 prevent relative rotation between their associated parts in the conventional manner. Conventional sliding seals 138 are also used as indicated.

A one-way check valve 104 of the spring biased ball type permits quick dumping of fluid pressure from chamber C4 back into chamber C3.

It will be noted that chamber C4 has a greater effective working area for the fluid pressure than does chamber C3.

*Operation of FIGURE 5 Mechanism*

When the mechanism is to be shifted to the engaged position from the disengaged position as shown in FIGURE 5, fluid pressure is admitted to chamber C3, causing engagement of the friction clutch and carrying teeth 120 into proximity with teeth 105 (FIG. 6). This movement of the ring R1 causes port 112 to be uncovered and fluid then slowly enters chamber C4.

Pressurization of chamber C4 causes the teeth 120 to bear firmly against teeth 105, (FIGURE 7) and this pressure in chamber C4 then overcomes the axial force in chamber C3. This causes very slight and momentary retraction of the pressure ring and consequent instantaneous slipping of the friction discs, which permits the teeth to become axially aligned. The clutch member then slides firmly into the fully engaged position FIGURE 8 where wall 119 abuts against member 116.

*General*

The interengageable teeth of the clutch elements may be beveled or crowned at their confronting edges to facilitate meshing thereof, but this does not prevent clashing and non-engagement of the teeth. These teeth may also be formed so as to create a "sucking" pressure when engaged which holds the teeth in engagement and prevents accidental disengagement in the event the fluid pressure system fails.

The invention can be utilized to clutch various types of rotary elements together, such as sleeves, hubs, drive cups or other elements than the coaxial shafts shown herein for illustrative purposes of one form of the invention.

While an axially aligned and a radially stacked arrangement of the two expansible chambers have been shown, respectively with double and single fluid passages, it should be realized that other fluid pressure controlling devices or combinations could be used and still fall within the scope of the invention as defined by the appended claims. For example, a single fluid passage and control could be used with the FIGURE 1 chamber arrangement, and a two control system used with the "over and under" chamber design.

Although certain terms have been used herein to describe the operation of the invention, they should not be interpreted in an unduly limiting manner. For example, the term "hydraulic" has sometimes been used, but the present clutch may be operated by any pressure fluid means, such as for example, oil or air.

Various modes of carrying out the invention are contemplated as being within the scope of the following claims particularly pointing out and distinctly claiming the subject matter which is regarded as the invention:

1. A synchronizing clutch mechanism having a drive element and a driven element with a friction clutch therebetween, positive clutch means carried by one element, said other element including a fluid pressure actuated ring for axial sliding in one direction to cause engagement of said friction clutch, said other element also including a fluid pressure actuated positive clutch member which forms an expansible fluid pressure chamber with said ring, said chamber when pressurized causing axial sliding of said positive clutch member in said one direction and into contact wtih said positive clutch means and then causing sliding of said ring in the opposite direction and slipping of said friction clutch to thereby permit axial alignment and complete engagement of said positive clutch means and positive clutch member to form a positive drive connection between said elements.

2. A synchronizing clutch mechanism having a drive element and a driven element with a friction clutch therebetween, positive clutch means carried by one element, said other element including a fluid pressure actuated ring and defining therewith an expansible fluid pressure chamber, said chamber when pressurized causing axial sliding of said ring in one direction and engagement of said friction clutch, said other element also including a fluid pressure actuated positive clutch member which forms a second expansible fluid pressure chamber with said ring, said second chamber when pressurized acting to urge said positive clutch member axially in said one direction and against said positive clutch means, said pressurized second chamber also causing said ring to slide in the opposite direction and consequent slipping of said friction clutch to thereby permit additional axial movement of said positive clutch member into complete engagement with said positive clutch means.

3. Mechanism as defined in claim 2 further characterized in that the transverse cross sectional area of said second chamber against which the fluid pressure is effective is greater than that of said first chamber.

4. A device as defined in claim 2 including a fluid inlet port in said ring which is in communication with said second chamber after said ring has caused engagement of said friction clutch to thereby permit said pressurization of said second chamber and consequent movement of said ring and positive clutch member.

5. A synchronizing clutch mechanism having a drive element and a driven element with a friction clutch therebetween, positive clutch means carried by one element, said other element including a fluid pressure actuated ring and also a fluid pressure actuated positive clutch member which is mounted on said ring for axial sliding therewith and relative to said ring, said ring and a portion of said other element together defining a first expansible fluid pressure chamber for causing axial sliding of said ring in one direction to engage said friction clutch, said ring and said positive clutch member together defining a second expansible fluid pressure chamber for causing said positive clutch member to bear against said positive clutch means and said ring to move away from said friction clutch to permit slipping thereof and axial alignment and complete engagement of said positive clutch means and positive clutch member.

6. A device as defined in claim 5 including a fluid inlet port in said ring which is in communication with said second chamber after said ring has caused engagement of said friction clutch to thereby permit said pressurization of said second chamber and consequent movement of said ring and positive clutch member.

7. Mechanism as defined in claim 5 further characterized in that the transverse cross sectional area against which fluid pressure is effective in said second chamber is greater than that of said first chamber.

8. Mechanism as set forth in claim 5 including a fluid port in said ring for placing said second chamber in communication with said first chamber after said ring has moved to cause said friction clutch engagement.

9. A synchronizing clutch mechanism having a drive element and a driven element with a friction clutch therebetween, positive clutch means carried by one element, said other element including (1) a fluid pressure actuated ring for axial sliding in one direction to cause engagement of said friction clutch and (2) a fluid pressure actuated positive clutch member, a first expansible fluid pressure chamber for sliding said ring in said one direction, and a second expansible fluid pressure chamber located between said ring and positive clutch member for causing the latter to bear firmly against said positive clutch means and simultaneously causing said ring to slide in the other direction, thereby permitting slipping of the friction clutch and positive engagement of the positive clutch member and means.

References Cited in the file of this patent

UNITED STATES PATENTS

| | | |
|---|---|---|
| 2,065,224 | Haladik | Dec. 22, 1936 |
| 2,592,695 | Hindmarch | Apr. 15, 1952 |
| 3,063,529 | Cook | Nov. 13, 1962 |